US007243266B2

(12) United States Patent
Hiramatsu et al.

(10) Patent No.: US 7,243,266 B2
(45) Date of Patent: Jul. 10, 2007

(54) COMPUTER SYSTEM AND DETECTING METHOD FOR DETECTING A SIGN OF FAILURE OF THE COMPUTER SYSTEM

(75) Inventors: Masami Hiramatsu, Yokohama (JP); Satoshi Oshima, Tachikawa (JP); Shinji Kimura, Sagamihara (JP); Masayoshi Takasugi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 464 days.

(21) Appl. No.: 10/798,276

(22) Filed: Mar. 12, 2004

(65) Prior Publication Data

US 2005/0081122 A1    Apr. 14, 2005

(30) Foreign Application Priority Data

Oct. 9, 2003    (JP) .............................. 2003-350818

(51) Int. Cl.
  *G06F 11/00*    (2006.01)
(52) U.S. Cl. ...................................... 714/37
(58) Field of Classification Search ................ 714/37, 714/11, 12, 47, 13
  See application file for complete search history.

(56) References Cited

U.S. PATENT DOCUMENTS 5,491,787 A  *  2/1996  Hashemi ........................ 714/11
7,024,581 B1 *  4/2006  Wang et al. .................... 714/2
7,028,218 B2 *  4/2006  Schwarm et al. ............. 714/11
7,069,473 B2 *  6/2006  Yasuda .......................... 714/37
2004/0225929 A1 * 11/2004  Agha et al. ................... 714/54

FOREIGN PATENT DOCUMENTS

JP    11-149385    6/1999

OTHER PUBLICATIONS

"Scheme and Problem of Fail-over", http://www.atmarkit.co.jp/flinux/rensai/clus ter02/cluster02.html.
OS series vol. 11, VM, Okazaki et al, Aug. 1, 1989, pp. 2-5, pp. 35-45.

* cited by examiner

*Primary Examiner*—Nadeem Iqbal
(74) *Attorney, Agent, or Firm*—Mattingly, Stanger, Malur & Brundidge, P.C.

(57) ABSTRACT

A service AP conducting ordinary business processing is executed on a first OS. The first OS includes an operation recording controller for recording operation conducted by the first OS as operation recording information together with time when the operation is conducted, and an auxiliary driver for accepting and executing external processing. A multi-OS controller interface included in a second OS, which is higher in reliability than the first OS, operates a multi-OS controller from an AP operating on the second OS. An analysis and prediction AP operating on the second OS analyzes states of the first OS and the service AP, and detects a failure sign. Upon detecting a failure sign, degrade operation of the OS or service AP to be analyzed, preparations for switching from an active system to a stand-by system, and actual switching are conducted before the failure occurs.

8 Claims, 12 Drawing Sheets

FIG. 6

| SIGN NUMBER | FAILURE SIGN PATTERN | DISPOSAL PROGRAM LIST | | |
|---|---|---|---|---|
| 1 | OPERATION RECORD IS INTERRUPTED | 1 | 4 | |
| 2 | ABNORMALITY OCCURS FROM DEVICE | 2 | 3 | |
| 3 | INTERRUPTS OCCUR FREQUENTLY | 1 | 2 | 4 |
| 4 | EXECUTION OF SERVICE AP STAGNATES | 4 | | |
| ... | ... | ... | | |

FIG. 7

| PROGRAM NUMBER | DISPOSAL OPERATION | |
|---|---|---|
| 0 | RE-START SERVICE AP | 1400 |
| 1 | RAISE EXECUTION PRIORITY OF SERVICE AP | 1401 |
| 2 | STOP USE OF SUBJECT DEVICE | 1402 |
| 3 | RE-START APPLICATION | 1403 |
| 4 | PROHIBIT ACCESS TO PERIPHERAL DEVICE | 1404 |
| 5 | LOWER OPERATION FREQUENCY OF CPU | 1405 |
| 6 | EXECUTE TEMPORARY STOP INSTRUCTION ON CPU | 1406 |
| 7 | RE-START FIRST OS | 1407 |
| ... | ... | |

| INFORMATION | LOGICAL ADDRESS | PHYSICAL ADDRESS |
|---|---|---|
| KERNEL PAGE DIRECTORY | 0xC0010000 | 0x00010000 |
| KERNEL PAGE TABLE | 0xC0010200 | 0x00010200 |
| ... | ... | ... |

COMPUTER SYSTEM AND DETECTING METHOD FOR DETECTING A SIGN OF FAILURE OF THE COMPUTER SYSTEM

BACKGROUND OF THE INVENTION

The present invention relates to a computer system and a detecting method for detecting a sign of a failure of the computer system. In particular, the present invention relates to a computer system and a detecting method for detecting a sign of a failure of the computer system capable of detecting a sign of failure of an application (AP), an operating system (OS) and hardware (HW) in its own system.

In general, an AP or an OS in a computer system sometimes fails and stops for various reasons such as a defect included in the AP or OS itself or a failure in a device used by the OS.

As a conventional technique concerning a technique for detecting a failure in an AP in the case where it is necessary to continue a function provided by the AP even when a failure as described has occurred, there is known a technique called heart beat whereby the time required until the processing is finished is monitored and a decision is made whether exchange of communication data has been completed within a predetermined time by using a watchdog timer. As another conventional technique, a technique of monitoring a log issued periodically by a system and detecting occurrence of a failure is known. As a conventional technique concerning the heart beat now in use in typical HA clusters, for example, a technique disclosed in http://www.atmarkit.co.jp/flinux/rensai/cluster02/clust er02.html is known.

SUMMARY OF THE INVENTION

As for conventional techniques concerning a failure monitoring method using the above-described heart beat, there are various techniques. In any of these methods, a failure is detected when some time has elapsed after actual occurrence of the failure. Therefore, any of these methods has a problem that detection of the failure always becomes late.

In the case where the load of the AP or OS has increased, the time required until the processing is finished or time required for exchange of communication data exceeds monitoring limit time in some cases. Therefore, the conventional technique using the heart beat or the watchdog timer has a problem that a failure is detected falsely in such a case.

In the method of monitoring the system log, a failure is detected when some time has elapsed after actual occurrence of the failure in the same way as the foregoing description. Therefore, the method of monitoring the system log has the problem that the detection of the failure always becomes late.

Failure monitoring in the above-described conventional techniques is conducted by a failure monitoring AP. However, the failure monitoring AP and an AP to be monitored are being executed on the same OS. In the case where a failure has occurred in the OS itself, therefore, the AP to be monitored is also involved in the failure of the OS and the monitoring function is lost, resulting in a problem.

In order to solve the problem, there is also a method of preparing a different computer as a computer for monitoring. In this case as well, however, there remains the problem that occurrence of a failure can be detected until the failure occurs.

In accordance with a first aspect of the present invention, the problems are solved by a computer system including a first OS, a service application operating on the first OS to conduct ordinary business processing, a second OS differing from the first OS, and an analysis and prediction application operating on the second OS, wherein the first OS holds state information and operation recording information of the first OS itself, and the analysis and prediction application analyzes contents of information held by the first OS and detects a sign of a failure.

In accordance with a second aspect of the present invention, the problems are solved by a computer system including a plurality of computers, each of the computers including a first OS, a service application operating on the first OS to conduct ordinary business processing, a second OS differing from the first OS, and an analysis and prediction application operating on the second OS, wherein the first OS holds state information and operation recording information of the first OS itself, and the analysis and prediction application analyzes contents of information held by the first OS, and if the analysis and prediction application in one computer has detected a sign of a failure that cannot be subject to self-restoration, the analysis and prediction application notifies another computer of analyzed contents of the failure to make it take over processing.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing a configuration example of a failure sign table 13;

FIG. 7 is a diagram showing a configuration example of a disposal program table 14;

DESCRIPTION OF THE EMBODIMENTS

Figure 1:
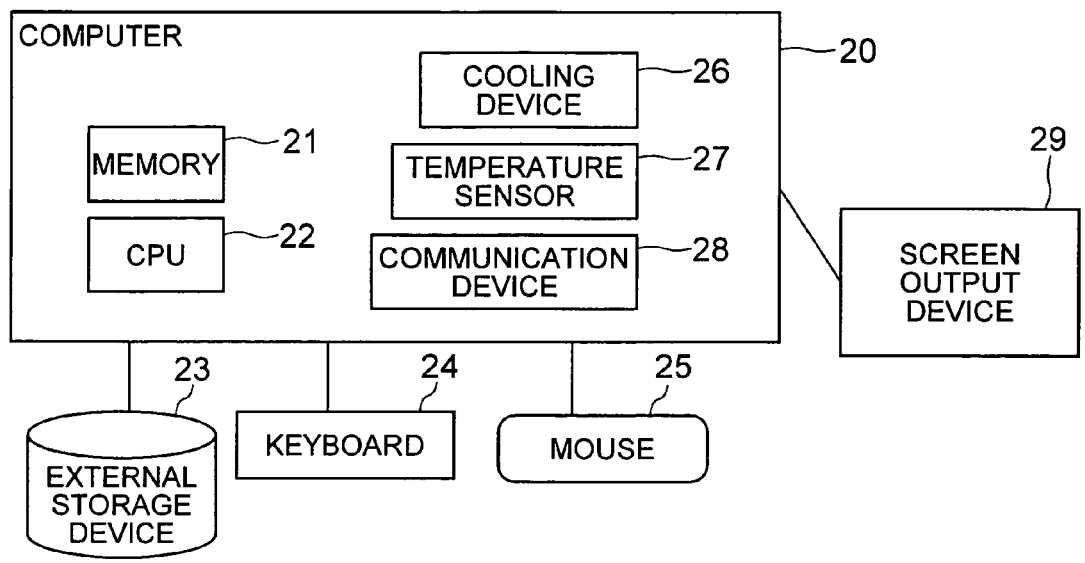
FIG. 1 is a diagram showing a hardware configuration example of a computer system according to a first embodiment.
Figure 2:
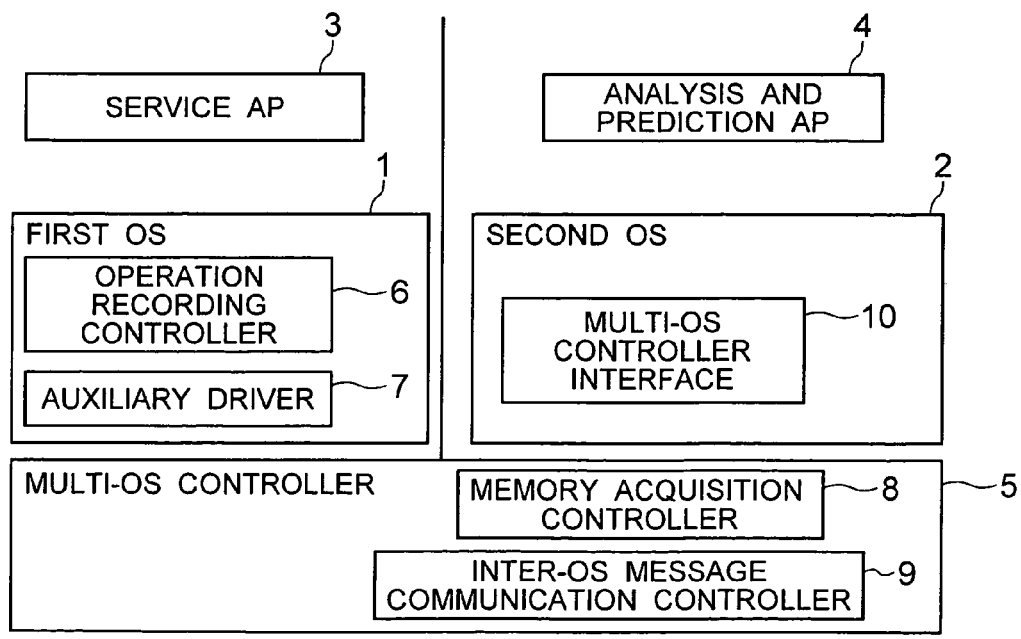
FIG. 2 is a diagram showing a configuration example of programs stored in a memory 21.

FIG. 1 is a diagram showing a hardware configuration of a computer system according to a first embodiment. FIG. 2 is a diagram showing a configuration of programs stored in a memory 21.

As shown in FIG. 1, the computer system according to the first embodiment includes a computer 20, and an external storage device 23, a keyboard 24, a mouse 25 and a screen output device 29, which are connected to the computer 20. The computer 20 includes a CPU (Central Processing Unit) 22, a main storage device (memory) 21, a cooling device 26, a temperature sensor 27 and a communication device 28.

As shown in FIG. 2, programs, i.e., a first OS 1, a second OS 2, a service AP 3, an analysis and prediction AP 4, and a multi-OS controller 5 are stored in the memory 21 in the computer 20. The first OS 1 includes an operation recording controller 6 and an auxiliary driver 7. The multi-OS controller 5 includes a memory acquisition controller 8 and an inter-OS message communication controller 9. The second OS 2 includes a multi-OS controller interface 10.

Figure 3:
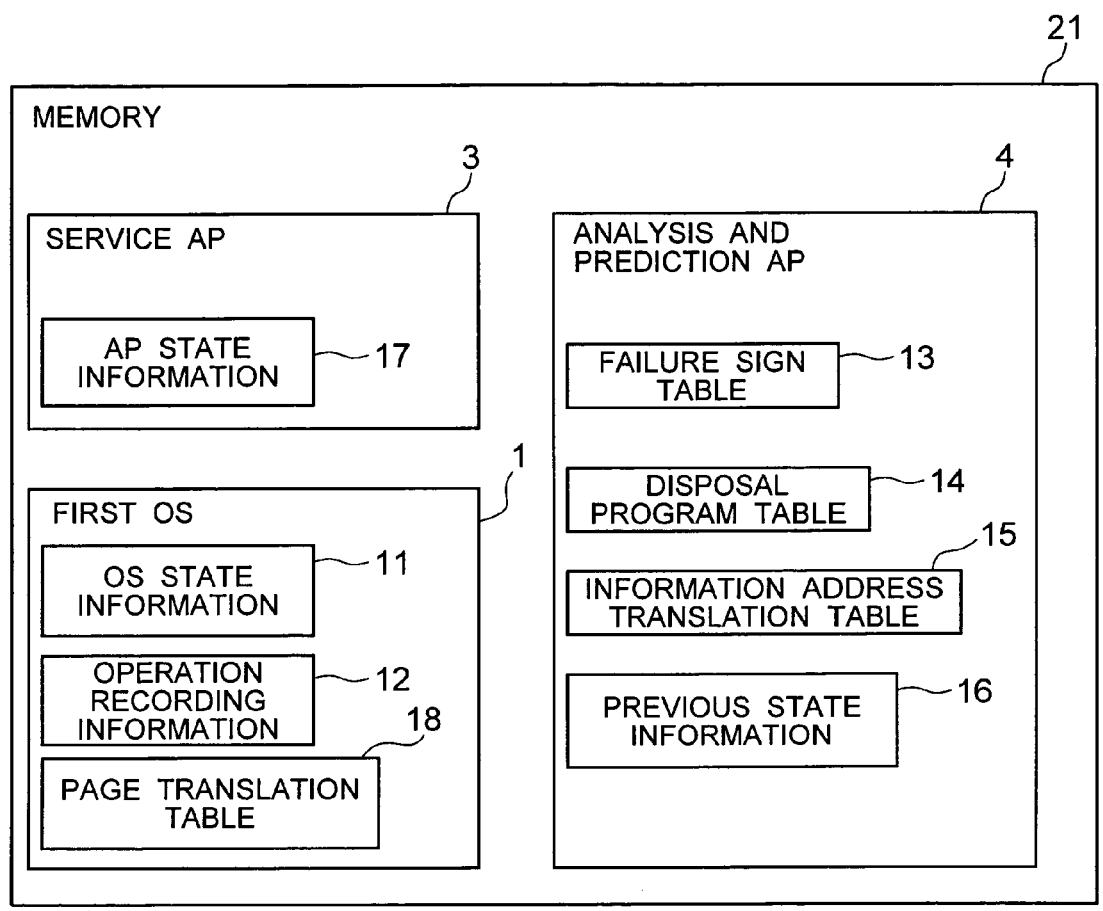
FIG. 3 is a diagram showing a configuration example of data tables provided in programs, which are stored in a memory 21.

FIG. 3 is a diagram showing a configuration of data tables provided in programs, which are stored in the memory 21. As shown in FIG. 3, the service AP includes AP state information 17, and the first OS 1 includes OS state information 11, operation recording information 12 and a page translation table 18. The analysis and prediction AP 4 includes a failure sign table 13, a disposal program table 14, an information address translation table 15 and a previous state information 16.

In the foregoing description, the first OS 1 is a general OS. The service AP 3 is an AP executed on the first OS 1, and it is a program for conducting ordinary business processing. The analysis and prediction AP 4 is an AP executed on the second OS 2, and it is a program for analyzing the state of the first OS 1 and the service AP 3 and detecting a failure sign. The second OS 2 is an OS that is different from the first OS 1. It is desirable that the second OS 2 is an OS that is higher in reliability than the first OS 1.

The operation recording controller 6 in the first OS 1 records operation conducted by the first OS 1 in the operation recording information 12 together with time when the operation has been conducted. Operations recorded here includes, for example, context switches of processes, interrupt processing, system call, memory assignment, and alarms and error operations output by the first OS 1 or the computer 20. The auxiliary driver 7 in the first OS 1 is an auxiliary program for assisting the analysis and prediction AP 4. The auxiliary driver 7 holds a list of a memory location where information to be analyzed is stored, an analysis method, and processing to be conducted against a failure, on the analysis and prediction AP 4. On the basis of a failure sign, the auxiliary driver 7 conducts processing against a failure of the first OS 1 by referring to contents of the processing list. The auxiliary driver 7 conducts processing of accepting processing from the outside of the first OS 1 and executing it. For example, the auxiliary driver 7 executes processing requested by the second OS 2. An order is given to the auxiliary driver 7 by using the inter-OS message communication controller 9 in the multi-OS controller 5.

The multi-OS controller interface 10 is provided as a function of the second OS 2. The multi-OS controller interface 10 is an interface for operating the multi-OS controller 5 from an AP operating on the second OS 2.

The OS state information 11 is information representing the current operation state of the first OS 1. As for information stored in the OS state information 11, there are process management information for managing an AP operating on the first OS 1, information concerning CPU time consumed by the OS and process, the use situation of locks for attaining the synchronization, information of a file or a file handle opened in the system, information concerning a memory managed by the first OS 1, the number of rotations of a fan in the cooling device 26, and information supplied from the temperature sensor 27.

The AP state information 17 is information that represents the operation state of the service AP 3. The AP state information 17 includes enough information to resume service from an interrupted point by using the information preserved as a check point, when the service that is being conducted by the service AP 3 has been interrupted. The page translation table 18 is a table referenced by the first OS 1 when translating a logical address, which is used when using a virtual memory function of the CPU, to a physical address.

FIG. 6 is a diagram showing a configuration of the failure sign table 13. The failure sign table 13 stores information to be used by the analysis and prediction AP 4 when analyzing the information of the first OS 1 or the service AP 3. The failure sign table 13 holds sets each including a failure sign pattern expected as a failure sign, a list of disposal program numbers to be used against the failure sign, and a sign number. For example, a failure sign pattern for a sign number 1 is "operation recording is interrupted," and program numbers 1 and 4 are held in a corresponding disposal list as a set. A failure sign pattern for a sign number 2 is "abnormality has occurred from a device," and program numbers 2 and 3 are held in a corresponding disposal list as a set.

FIG. 7 is a diagram showing a configuration example of the disposal program table 14. The disposal program table 14 holds a disposal program number of each of disposal programs held in the list of the disposal program numbers in the failure sign table 13 shown in FIG. 6, and a content of disposal operation executed by the program.

Figures 8, 9:
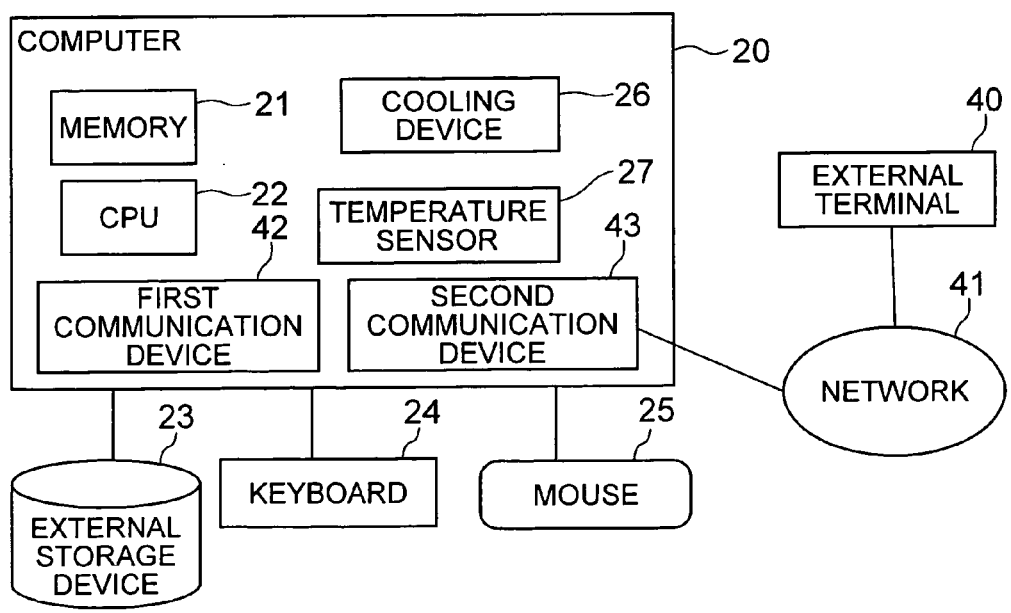
FIG. 8 is a diagram showing a configuration example of an information address translation table 15.
FIG. 9 is a diagram showing a hardware configuration example of a computer system according to a second embodiment.

FIG. 8 is a diagram showing a configuration of the information address translation table 15. The information address translation table 15 is a table for conducting translation between a logical address, which is required for the second OS 2 to access the AP state information 17 owned by the service AP on the first OS 1 and the OS state information 11 and the operation recording information 12 owned by the first OS 1, and a physical address. The information address translation table 15 holds sets each including information of a kernel page, which indicates the AP state information 17, the OS state information 11 and the operation recording information 12, a logical address and a physical address.

Although not illustrated, the previous state information 16 holds data required to check a failure sign, among results of analysis conducted heretofore by the analysis and prediction AP 4, the check point information of the AP state information 17, and the OS state information 11.

The multi-OS controller 5 exercises control so as to make it possible for the first OS 1 and the second OS 2 operating on the multi-OS controller 5 to execute various kinds of processing independently of each other. The expression "execute independently" means that the two OS's use the memory 21 and input-output devices, which are resources of the computer, divisionally and execution by one of the OS's does not affect the other. A technique of executing a plurality of OS's independently on one computer is disclosed in, for example, JP-A-11-149385. According to JP-A-11-149385, the first OS 1 and the second OS 2 can be executed independently, and even when the first OS 1 has stopped because of a failure, the second OS 2 can operate continuously.

Furthermore, the multi-OS controller 5 includes the memory acquisition controller 8, which makes it possible for one OS to access a physical memory which is being used by the other OS. The memory acquisition controller 8 is, for example, a function of determining whether a page located at a physical address in a certain OS can be accessed from an OS that has issued an access request, assigning the page directly to a page table, and copying page contents between OS's.

The multi-OS controller 5 further includes the inter-OS message communication controller 9, which is a function of calling a procedure of an OS of the opposite party so as to make it possible to exchange information between OS's.

Figure 4:
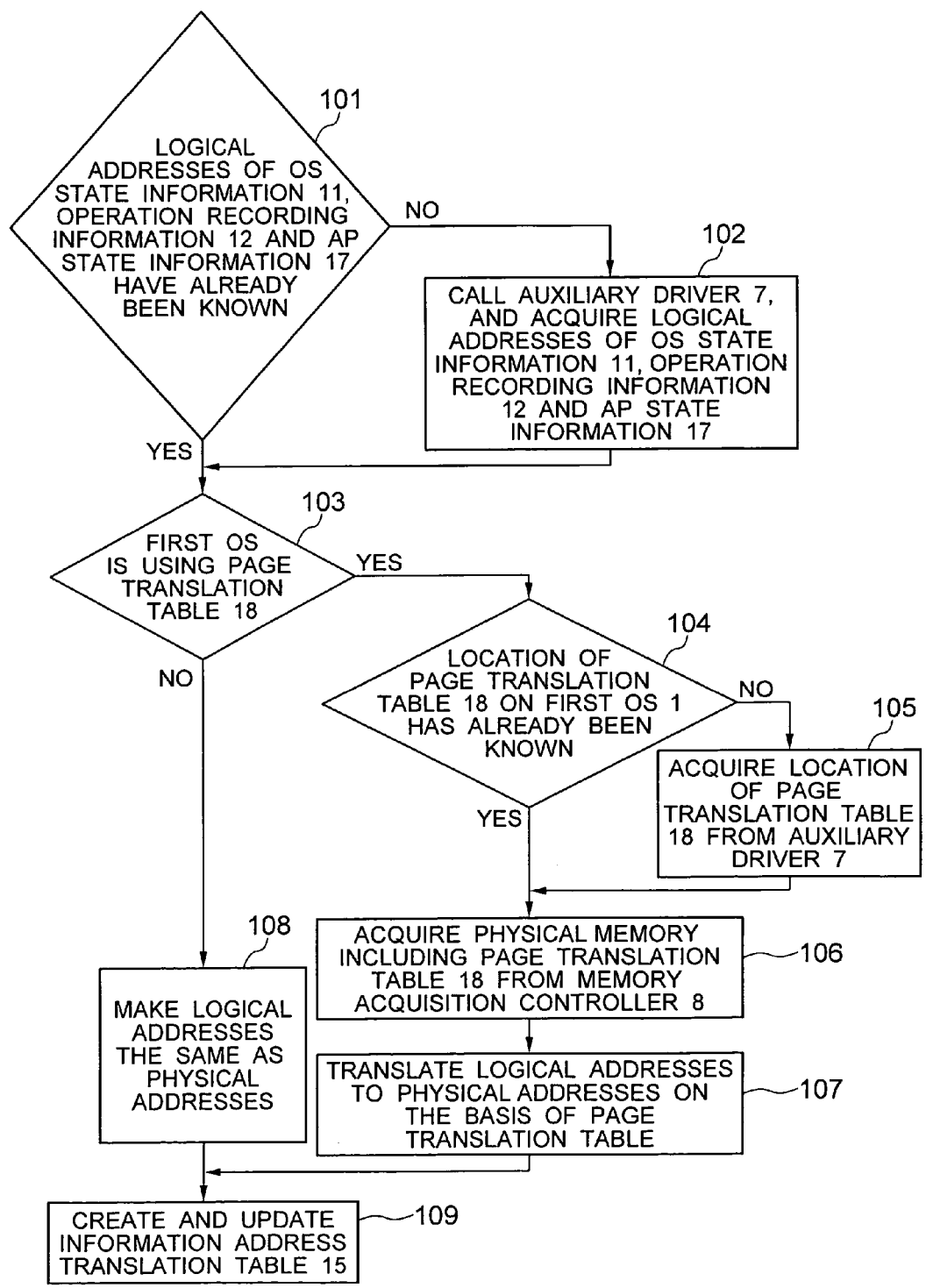
FIG. 4 is a flow chart showing processing operation conducted when a second OS 2 creates and updates an information address translation table 15.

FIG. 4 is a flow chart showing processing operation conducted when the second OS 2 creates and updates the information address translation table 15. The flow chart shown in FIG. 4 will now be described. When a computer system begins to work, the second OS 2 does not have information of memory addresses at which the AP state information 17, the OS state information 11 and the operation recording information 12 are stored, unlike the first OS 1. Therefore, those addresses are taken in, and the information address translation table 15 as shown in FIG. 8 is created. This processing is the processing shown in FIG. 4.

(1) First, a decision is made whether the logical addresses in the memory at which the AP state information 17, the OS state information 11 and the operation recording information 12 are stored in the first OS 1 have already been acquired and known (step 101).

(2) If it is found as a result of the decision at the step 101 that the logical addresses of the operation recording information 12, the OS state information 11 and the AP state information 17 stored in the first OS 1 have not yet been known, the auxiliary driver 7 is called and the logical addresses of the operation recording information 12, the OS state information 11 and the AP state information 17 are acquired (step 102).

(3) In the case where it is found as a result of the decision at the step 101 that the logical addresses of the operation recording information 12, the OS state information 11 and the AP state information 17 have already been known, or after these logical addresses are acquired by the processing conducted at the step 102, a decision is made whether the first OS 1 is using the page translation table 18 (step 103).

(4) If it is found as a result of the decision at the step 103 that the first OS 1 is using the page translation table 18, a decision is made whether the location of the page translation table 18 has previously been known. If the location of the page translation table 18 has not previously been known, the auxiliary driver 7 is called and the location of the page translation table 18 is acquired (steps 104 and 105).

(5) In the case where it is found as a result of the decision at the step 104 that the location of the page translation table 18 has previously been known, or after the location of the page translation table 18 is acquired by the processing conducted at the step 105, the page translation table 18 itself is acquired by the memory acquisition controller 8 (step 106).

(6) Thereafter, the logical addresses of the operation recording information 12, the OS state information 11 and the AP state information 17 are translated to physical addresses on the basis of the acquired page translation table 18, and the information address translation table 15 is created (steps 107 and 109).

(7) If it is found as a result of the decision at the step 103 that the first OS 1 is not using the page translation table 18, the logical addresses are decided to be used as physical addresses and the information address translation table 15 is created (steps 108 and 109).

If it is found as a result of decision at the step 104 that the location of the page translation table 18 has not been known, alternatively it is possible that the page translation table 18 is acquired from a control register in the CPU 22 when the multi-OS controller 5 operates in order to switch the OS. By doing so, it becomes unnecessary to search for the page translation table 18.

Furthermore, as the method for acquiring the logical addresses and physical addresses of the operation recording information 12, the OS state information 11 and the AP state information 17, there is also a method of preparing means whereby the first OS 1 or the auxiliary driver 7 incorporated in the first OS 1 accesses these kinds of information and providing the multi-OS controller 5 with an interface for registering information concerning locations of these kinds of information in the multi-OS controller 5. By doing so, it becomes possible to cope with even if the location of the OS state information 11 on the memory dynamically changes.

Figure 5:
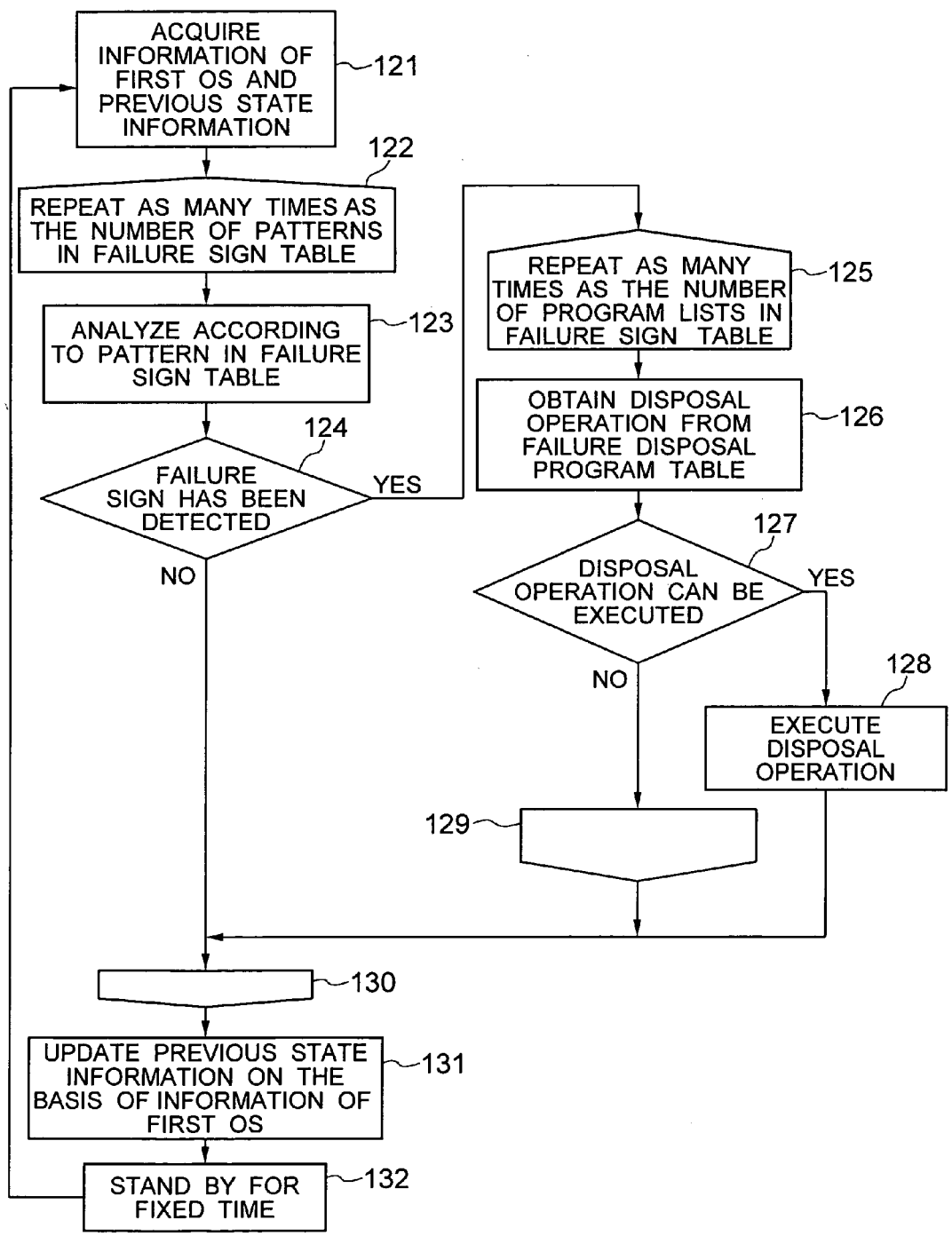
FIG. 5 is a flow chart showing control on processing operation of an analysis and prediction AP 4 on a second OS 2.

FIG. 5 is a flow chart showing processing operation of the analysis and prediction AP 4 on the second OS 2. The flow chart will now be described. In the flow shown in FIG. 5, step 130 provided with no description is a processing step for returning the flow to processing of step 123 in response to processing of repetition at step 122. In the same way, step 129 provided with no description is a processing step for returning the flow to processing of step 126 in response to processing of repetition at step 125.

(1) First, the analysis and prediction AP 4 acquires contents of the OS state information 11 and the operation recording information 12 in the first OS 1 and the AP state information 17 in the service AP 3 by using the memory acquisition controller 8 in the multi-OS controller 5 and the information address translation table 15. Furthermore, the analysis and prediction AP 4 acquires previous state information of the first OS 1 and the service AP 3 from the previous state information 16 (step 121).

(2) Subsequently, the analysis and prediction AP 4 performs an analysis on the information acquired by the processing conducted at the step 121, according to a pattern in the failure sign table 13, and checks the pattern of the change in the operation or state leading to a failure, on the basis of information acquired by the processing at the step 121. This check is repeated as many times as the number of patterns in the failure sign table 13 (steps 122, 123 and 130).

(3) A decision is made whether a failure sign has been detected as a result of the analysis. If a failure sign has been detected, a program list for performing failure disposal associated with a pattern in the failure sign table 13 is obtained and the following processing operation is repeated (steps 124 and 125).

(4) First, a disposal program is obtained from the disposal program table 14, and a decision is made whether disposal operation conducted by the disposal program can be executed. If the disposal operation can be executed, the disposal operation is executed (steps 126 to 128).

(5) If it is determined as a result of the decision at the step 127 that the disposal operation cannot be executed, the flow returns to the processing of the step 126 and new disposal operation is attempted (step 129).

(6) If all patterns in the failure sign table are checked and disposal operation is finished, or a failure sign cannot be detected by repetition of the processing of the steps 123 and 124, then the analysis and prediction AP 4 updates information in the previous state information 16 by using information acquired by the processing at the step 121 (step 131) so as to be able to resume the service AP 3. After the operation is stopped for a fixed time, the flow returns to the processing beginning with the step 121 and processing of the failure analysis is continued (steps 131 and 132).

Each of the above-described processing according to the embodiment can be formed as a processing program. This processing program can be stored on a recording medium such as an HD (Hard Disk), DAT (Digital Audio Tape), MO (Magnet Optical Disk), DVD (Digital Versatile Disk) or CD (Compact Disk), and provided, or provided via a network.

As failure sign patterns registered in the failure sign table 13, there are, for example, patterns described hereafter.

A pattern in which information of the service AP 3 is not found even if process management information in the OS state information 11 is analyzed and abnormal termination of the service AP 3 is recorded in alarm information in the operation recording information. In this case, it is determined that a failure in the service AP 3 has occurred.

A pattern in which it is found from execution history of context switches mentioned in the operation recording information 12 that CPU time is not assigned to the service AP 3 for a fixed time and the service AP 3 is not executed. And a pattern in which in this case it has been found on the basis of the process management information in the OS state information 11 and the use situation of the lock that the service AP 3 waits for some operation. In these cases, it is determined that a failure has occurred in assignment of CPU time to the service AP 3.

A pattern in which it is detected on the basis of history information of operation concerning interrupts in the operation recording information 12 that the response speed from the keyboard 24, the mouse 25 or the communication device 28 is late as compared with the steady state recorded in the previous state information 16. In this case, it is determined that a sign of a fall in service quality or of a failure in the device itself has appeared.

A pattern in which a parity error of the memory 21 is reported in error history information in the operation recording information 12. In this case, it is determined that a sign of a failure of the memory 21 has appeared.

A pattern in which it is detected on the basis of a record of inter-process communication in the operation recording information 12, a record of memory assignment in the first OS 1 and the memory use situation in the OS state information that abnormal termination of some AP has been caused by out of memory. In this case, it is determined that a sign of a failure caused by memory leak or of a failure caused by overload has appeared.

A pattern in which it is detected on the basis of the OS state information 11 that a margin is lost in system resources such as file handles. In this case, there is a possibility of resource shortage, and it is determined that a failure sign has appeared.

A pattern in which the ratio between CPU time consumed by the first OS 1 itself and CPU time consumed by the service AP 3 is checked by checking consumption of the CPU time consumed by the OS's in the OS state information 11 and it is detected that the ratio of the first OS 1 is extremely large as compared with the ratio recorded in the previous state holding controller 16. In this case, there is a possibility that the service quality has begun to fall and it is determined that a failure sign has appeared.

A pattern in which it is detected on the basis of the interrupt history in the operation recording information 12 that interrupts occur frequently and it is detected on the basis of the OS state information 11 that the CPU time consumed by the first OS 1 is much. In this case, there is a possibility that the service quality has begun to fall, and it is determined that a failure sign has appeared.

A pattern in which it is detected on the basis of error occurrence history information in the operation recording information 12 that a disk access error has occurred. In this case, there is a possibility that a physical life of the disk has been reached or a defect has occurred, and it is determined that a failure sign has appeared.

A pattern in which it is detected on the basis of the temperature sensor information in the OS state information 11 that the temperature of the CPU 23 or the computer 20 has risen or the number of rotations of the fan in the cooling device has fallen as compared with the steady-state recorded in the previous state information 16. In this case, there is a possibility that a hardware failure is caused, and it is determined that a failure sign has appeared.

Data, such as the OS state information 11, the operation recording information 12 and the AP state information 17, are data that are high in importance and high in access frequency in the first OS 1 as well. A pattern in which the data are swapped out on the disk. In this case, it is determined that the memory is in a serious deficiency state.

Examples of disposal operations in disposal programs registered in the disposal program table 14 shown in FIG. 7 will now be described with reference to FIG. 7.

In the case where abnormal termination of the service AP 3 has occurred, a program having a program number 0 starts the service AP 3 again (1400).

In the case where execution of the service AP 3 is at a standstill or the service AP 3 is waiting for execution of other APs, a program having a program number 1 orders the auxiliary driver 7 to raise the priorities of these APs (1401).

In the case where a failure of a certain device is predicted, a program having a program number 2 prohibits the use of the device. Furthermore, in the case of a failure of the memory 21, the program having the program number 2 gives an order by using the inter-OS message communication controller 9 in the multi-OS controller 5 so as not to assign a corresponding portion. For example, in the case where there are a plurality of external storage devices 23 and a defect is found in one of the external storage devices 23, it is not necessary to stop the whole computer 20 provided that another storage device can be used. Therefore, only a storage device in which the defect has occurred is made unusable and operation of the computer is continued (1402).

In the case where a failure sign leading to memory shortage or resource shortage has been detected, a program having a program number 3 orders the auxiliary driver 7 to re-start an AP that is consuming a large quantity of memories and resources (1403).

In the case where interrupts occur frequently, a program having a program number 4 orders the auxiliary driver 7 to stop operation onto a device causing interrupt processing and changes operation conducted at the time of an interrupt (1404).

In the case where a failure sign has appeared in the cooling device 26, a program having a program number 5 lowers the operation frequency of the CPU 22 by using the auxiliary driver 7 (1405), and a program having a program number 6 orders to suppress the heat generation by, for example, executing a temporary stop instruction for the CPU 22 when the first OS 1 operates (1406).

In the case where the above-described failure disposal operations cannot be executed, finally a program having a program number 7 re-starts the first OS 1 (1407).

When the first OS 1 or the service AP 3 is restarted in the foregoing description, operation of the service AP 3 is resumed by using the AP state information saved in the previous state information 16 immediately before.

By using the method described heretofore, in the first embodiment, it is possible to detect a sign before an actual failure occurs in the first OS 1 and make the first OS 1 operate so as to prevent the failure.

FIG. 9 is a block diagram showing a hardware configuration of a computer system according to a second embodiment. The second embodiment is the same as the first embodiment in configuration except the hardware configuration and in operation.

Unlike the first embodiment shown in FIG. 1, in the second embodiment shown in FIG. 9, an external terminal 40 is prepared to conduct monitoring from the outside. Information concerning a failure sign detected by the analysis and prediction AP 4 is sent to the external terminal 40. Disposal operation corresponding to this failure can be conducted from the external terminal 40. In addition, in the case where a failure that cannot be subject to self-restoration is predicted, it is possible to request the external terminal to cope with.

The external terminal 40 and the computer 20 can communicate with each other by using a network 41. Information can be exchanged between the external terminal 40 and the computer 20. The network 41 is connected to a second communication device 43, which can be available from only the second OS 2. By doing so, it is possible to use the network 41 safely from the second OS 2 even if a failure sign is appearing in a first communication device 42 used by the first OS 1. In order to reduce the cost, the second embodiment may be formed so that the first OS 1 and the second OS 2 will share the same first communication device 42. At this time, however, only the case where a sign of a failure other than a failure of the first communication device 42 has appeared is coped with.

Before a failure actually occurs in the first OS 1, it is possible according to the second embodiment to detect its sign and notify the outside of a failure that might actually occur. Even in the case where there is a manager outside, the external manager can cope with the sign suitably.

Figure 10:
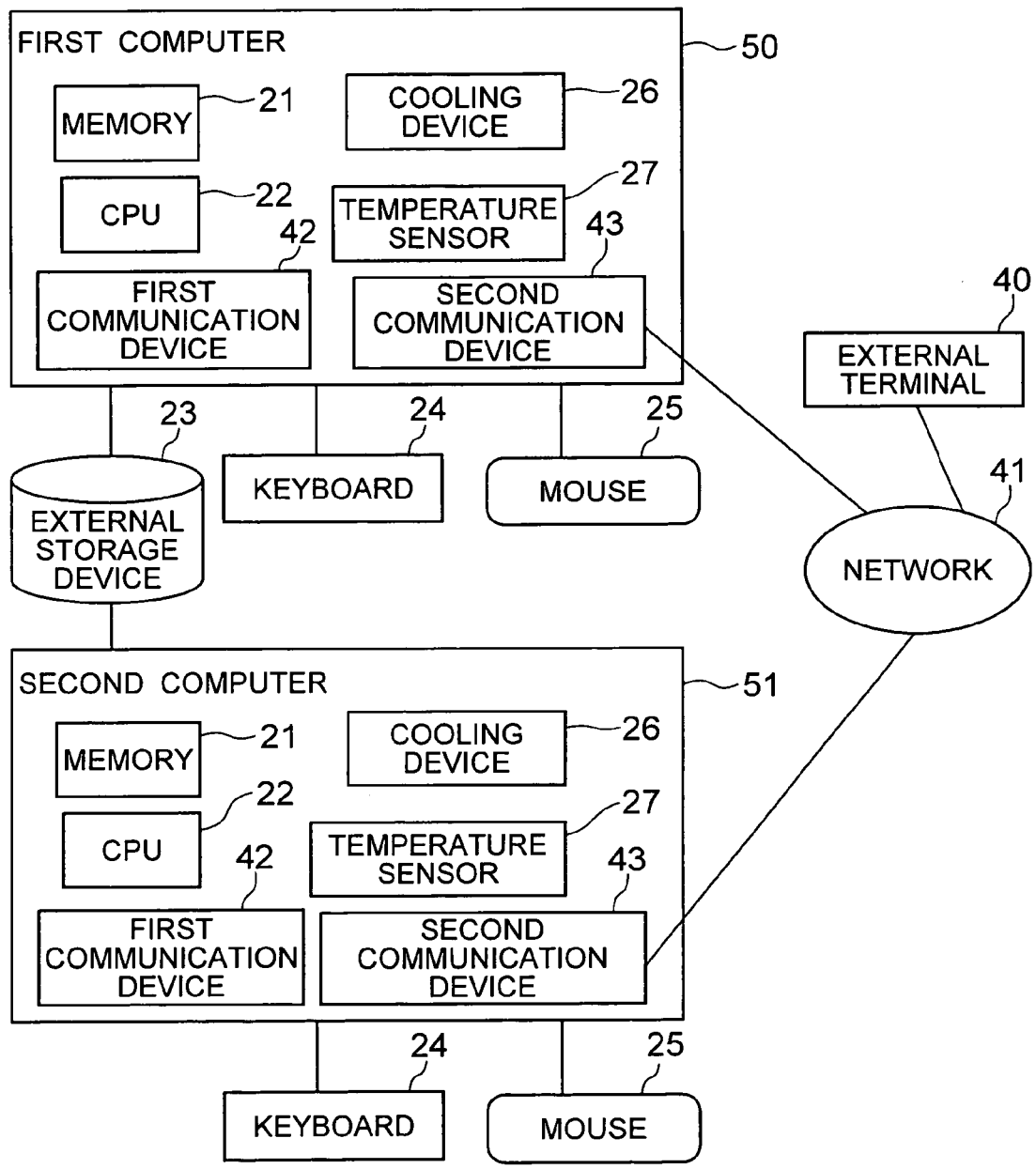
FIG. 10 is a diagram showing a hardware configuration example of a computer system according to a third embodiment.

FIG. 10 is a diagram showing a hardware configuration of a computer system according to a third embodiment. In the third embodiment shown in FIG. 10, a plurality of computer systems each according to the second embodiment are coupled to continue the service even when a failure has occurred. The third embodiment is the same as the first embodiment in configuration other than the hardware configuration and in operation.

A computer system according to the third embodiment shown in FIG. 10 includes a first computer 50 of an active system, which provides service at the time of ordinary time, and a second computer 51 of a stand-by system, which can be used instead of the first computer 50. The first computer 50 and the second computer 51 are connected to each other via a network 41 by communication devices 43, which can be used only from the second OS's respectively included in the first and second computers. An external terminal 40 for management is connected to the network 41, which is connected to the communication devices 43. Furthermore, the first computer 50 and the second computer 51 share an external storage device 23 disposed between them.

It is supposed that in the computer system according to the third embodiment having the above-described configuration a sign of a failure has been detected in the first OS 1 in the first computer 50. At this time, the analysis and prediction AP 4 in the first computer 50 notifies the second computer 51 of the sign of the failure, which has occurred in the first computer 50, and its history and state via the second communication devices 43 in the first computer 50 before the failure occurs. On the basis of the information, the second computer 51 provides against the failure of the first computer 50, and conducts processing for service transfer. Furthermore, the second computer 51 can cope with occurrence of a similar failure in its own computer on the basis of the information. For example, in the case where there is a possibility of occurrence of a failure, the second computer 51 can previously transmit the OS state information 11, the operation recording information 12, the previous state information 16 and the AP state information 17 in the first computer 50 to the analysis and prediction AP 4 in the second computer 51, and previously analyzes an operation leading to a failure. As a result, it is possible to prevent the same failure as that in the first computer 50 from occurring in the first OS 1 in the second computer 51.

Figure 11:
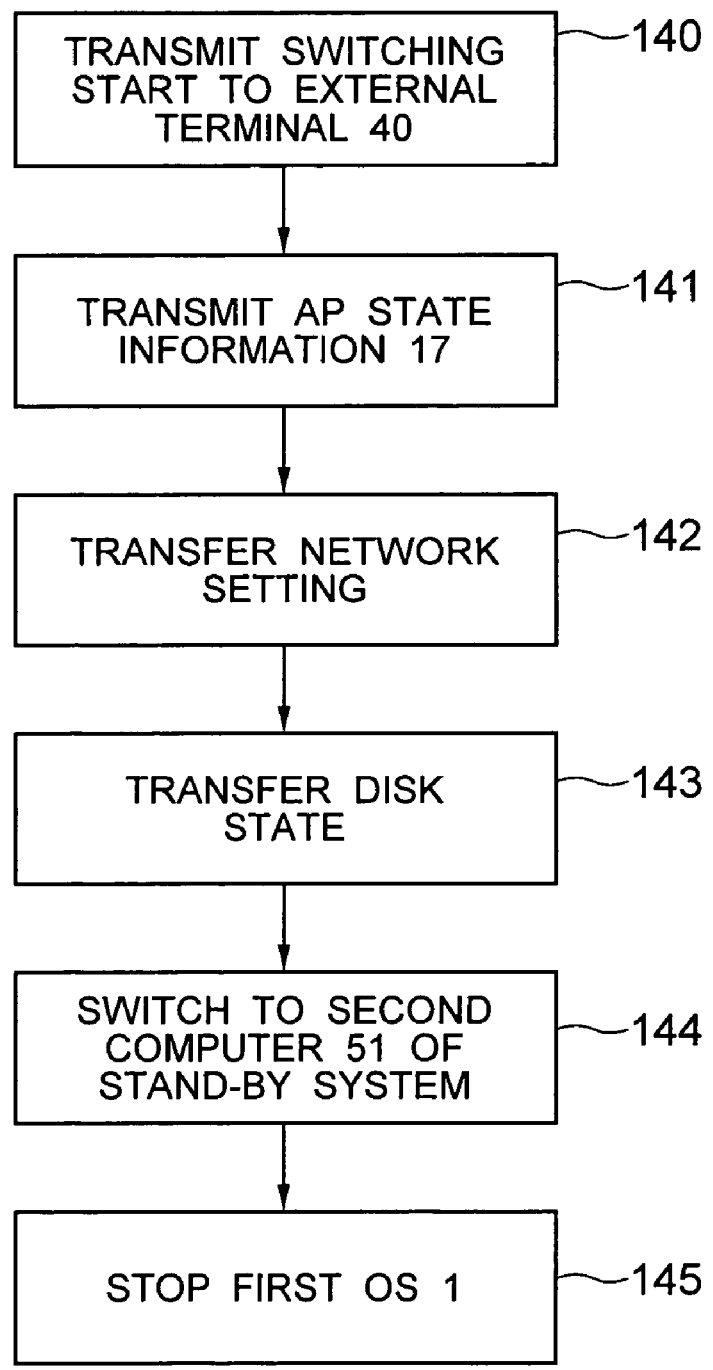
FIG. 11 is a flow chart showing a processing operation example for service transfer in a third embodiment.

FIG. 11 is a flow chart showing processing operation for service transfer in the third embodiment. The flow chart shown in FIG. 11 will now be described.

(1) When a failure has been detected in the first OS 1 in the first computer 50, the analysis and prediction AP 4 in the first computer 50 first transmits a switching start signal to the external terminal 40, and transmits the AP state information 17 to the second computer 51 in order to resume the service of the service AP 3 in the first computer 50 (steps 140 and 141).

(2) Subsequently, the first computer 50 and the second computer 51 conduct transfer of network setting and transfer of the external storage device. Finally, operation is switched to the second computer 51, and the first OS 1 in the first computer 50 is stopped (steps 142 to 145).

In the description of the service transfer, the switching start signal is first transmitted to the external terminal 40. Alternatively, after the switching processing has been finished, a failure report of the first OS 1 in the first computer 50 may be transmitted from the second OS 2 in the second computer 51 to the external terminal 40.

Transmission of the information for transfer to the second computer 51 is conducted via the second communication device 43 in the same way as the transmission of the failure sign information to the second computer 51.

Furthermore, in the third embodiment, it is also possible to use the first communication devices 42 used by the first OS's as the second communication devices 43 in the first and second computers 50 and 51 and thereby transmit the information of the failure sign and the information for transfer. As a result, it becomes unnecessary to separately prepare the communication device 43 in each of the computers.

In the case where it is not necessary to transfer the disk state in the third embodiment, it is also possible to provide each of the computers with an individual external storage device 23 instead of sharing the external storage device 23. In this case, execution of the processing at the step 143 in the flow shown in FIG. 11 can be omitted.

Furthermore, in the third embodiment, it is possible to turn off the power supply of the second computer 51 until transfer due to a failure is conducted, in order to hold down the power consumption in the second computer 51 serving as the stand-by system. In this case, it is possible to hold down the service stop time to the minimum by starting the second computer 51 when a failure in the first computer 50 is expected and conducting the transfer operation before the failure occurs.

According to the third embodiment having the above-described configuration, it is possible to continue business processing of the service AP 3 for conducting business by using the computer of the stand-by system even when a failure that cannot be avoided is expected in the first OS 1 in the computer of the active system.

In the foregoing description of the third embodiment, two computers, which are independent as computers, are used as the active system and the stand-by system. Alternatively, it is also possible to use a virtual computer having a logical partitioning controller as a computer and use the logical partitioning controller included in the virtual computer as the multi-OS controller 5.

The logical partitioning controller is introduced in OS series volume 11 VM (written by Tadao Okazaki and Minoru Massaki and published by Kyoritsu Publication) as a controller (CP) of a virtual computer. According to this, the CPU includes a shadow table, which represents a state of assignment of virtual physical memories to virtual computers, and a VMBLOCK, which represents states of registers in the virtual CPU.

Figure 12:
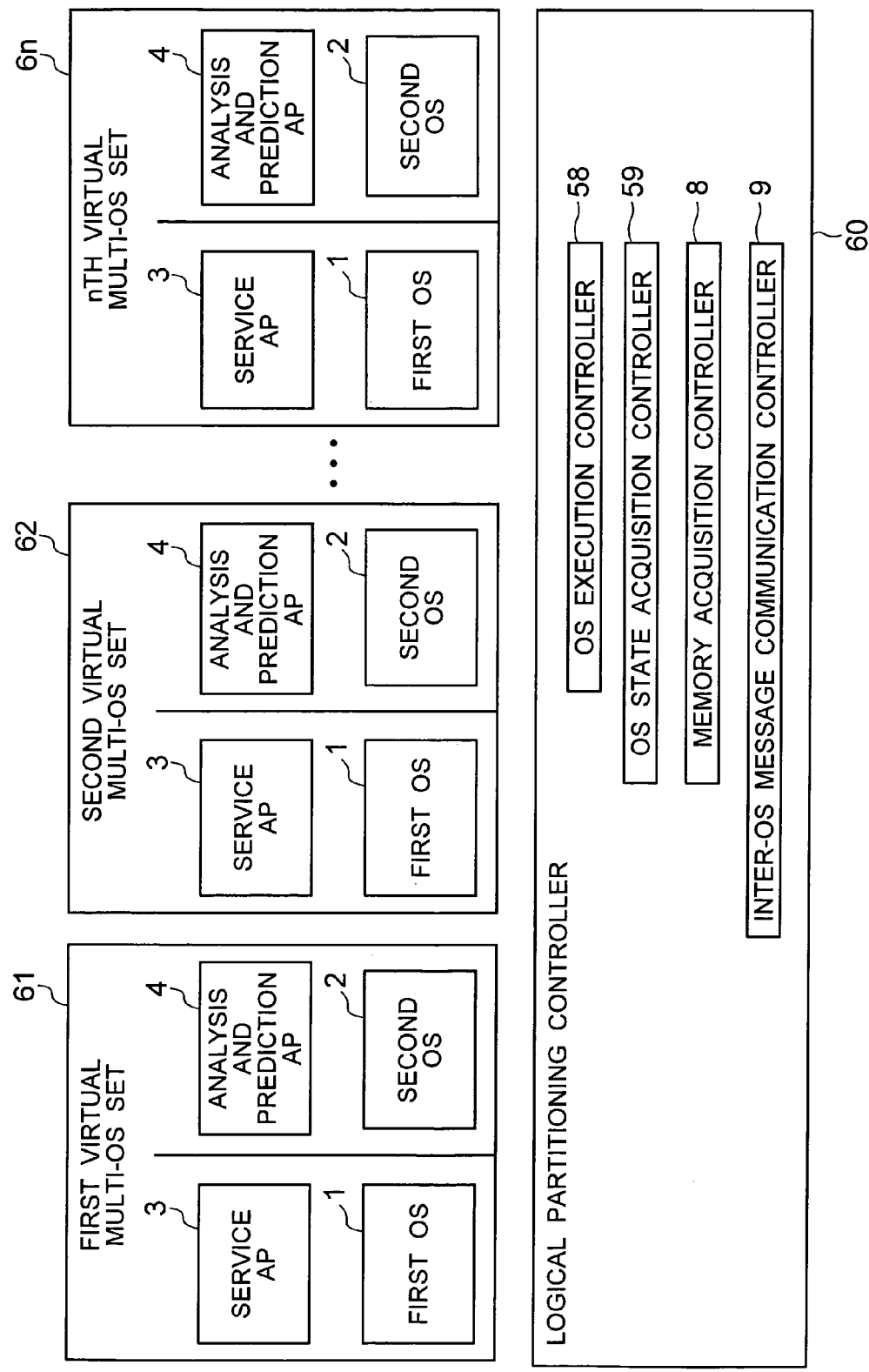
FIG. 12 is a diagram showing a program configuration example of a computer system according to a fourth embodiment.

FIG. 12 is a block diagram showing a program configuration of a computer system according to a fourth embodiment. The fourth embodiment shown in FIG. 12 is formed by using the logical partitioning controller instead of the multi-OS controller 5. A logical partitioning controller 60 used in the fourth embodiment shown in FIG. 12 is a logical partitioning controller typically provided when a virtual computer system is formed by conducting logical partition. The logical partitioning controller 60 includes an OS state acquisition controller 59 capable of acquiring the shadow table and VMBLOCK, and an OS execution controller 58 for controlling the execution of the other OS. In addition, the logical partitioning controller 60 includes a memory acquisition controller 8 and an inter-OS message communication controller 9 for the present invention. Programs forming the computer system according to the fourth embodiment are stored in the memory 21.

In the computer system according to the fourth embodiment, the logical partitioning controller 60 is used and consequently there are two or more OS's operating on the computer. Among them, an OS belonging to an OS group on which the service AP 3 conducting the ordinary business operates is used as the first OS 1, and an OS belonging to an OS group on which the analysis and prediction AP 4 operates is used as the second OS 2. A virtual multi-OS set is formed by including the first OS 1 and the second OS 2. A first virtual multi-OS set 61 to an n-th virtual multi-OS set 6*n*, which are arbitrary n virtual multi-OS sets, are implemented.

The logical partitioning controller 60 executes the first OS 1 and the second OS 2 belonging to each of the virtual multi-OS sets 61 to 6*n* while alternately switching them. While the analysis and prediction AP 4 is operating, therefore, the operation of the first OS 1 to be monitored can be stopped certainly. While the analysis and prediction AP 4 is operating, therefore, it is possible to prevent the first OS 1 from operating and rewriting data on the memory without permission.

According to the fourth embodiment having the above-described configuration, the multi-OS environment can be implemented also on the computers having the logical partitioning controller 60.

Figure 13:
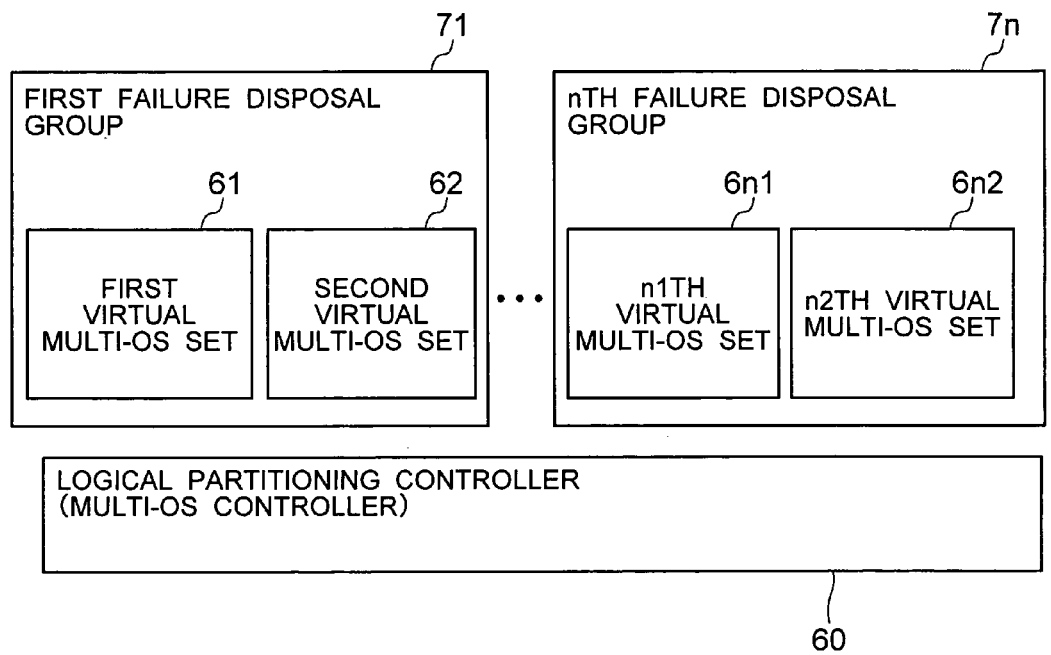
FIG. 13 is a diagram showing a program configuration example of a computer system according to a fifth embodiment.

FIG. 13 is a diagram showing a program configuration of a computer system according to a fifth embodiment. The fifth embodiment shown in FIG. 13 is an example formed by collecting a plurality of the virtual multi-OS sets in the fourth embodiment and thereby forming a failure disposal group.

The fifth embodiment shown in FIG. 13 includes a plurality of failure disposal groups 71 to 7*n* and the logical partitioning controller 60 formed as shown in FIG. 12. Each of the first to nth failure disposal groups 71 to 7*n* includes two or more virtual multi-OS sets 61 and 62 to 6*n*1 and 6*n*2 (only two virtual multi-OS sets is shown in FIG. 13). In each virtual multi-OS set, one system having the first OS 1, which gives service at the ordinary time, is used as the active system, and the other system, which takes over service when a failure has occurred in the active system, is used as the stand-by system. If a failure is predicted in the virtual multi-OS set 61, which is the active system in the first failure disposal group 71, service transfer to the virtual multi-OS set 62, which is a stand-by system in the same group, is conducted. The Inter-OS message communication controller 9 in the logical partitioning controller 60 is used for communication for service transfer.

According to the fifth embodiment having the above-described configuration, it becomes possible to form a computer system capable of continuing to provide service stably without increasing the number of physical computers.

Figure 14:
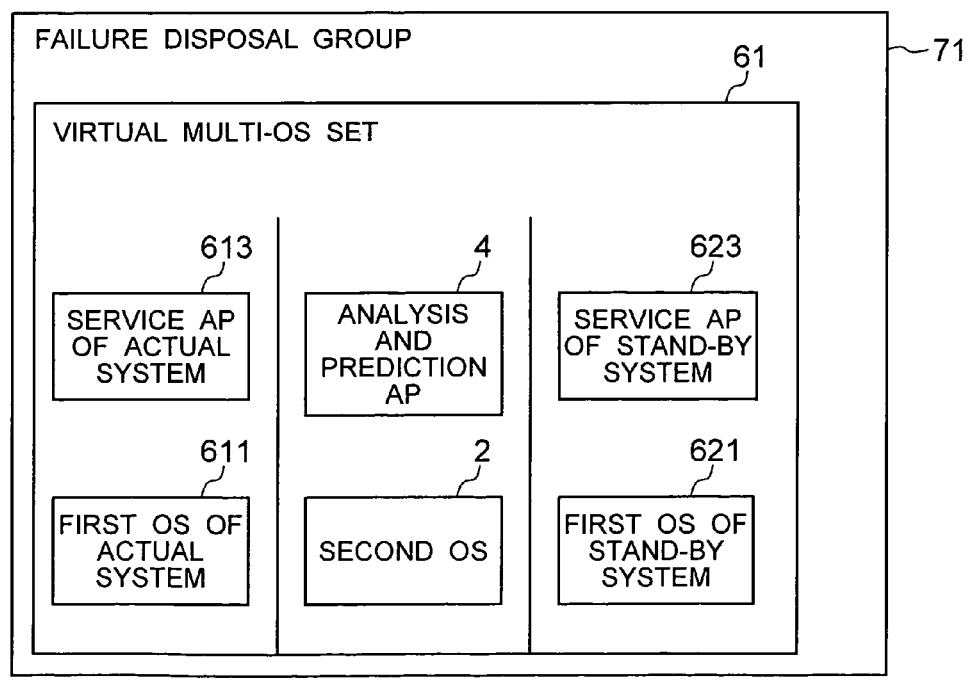
FIG. 14 is a diagram showing a program configuration example of a computer system according to a sixth embodiment.

FIG. 14 is a block diagram showing a program configuration of a computer system according to a sixth embodiment. In the sixth embodiment shown in FIG. 14, one virtual multi-OS set 61 in the fifth embodiment includes a first OS 611 of an active system, a first OS 621 of a stand-by system, one second OS 2, and an analysis and prediction AP 4.

In other words, in the sixth embodiment shown in FIG. 14, the virtual multi-OS set 61 is formed so that the first OS 611 of the active system and the first OS 621 of the stand-by system share the second OS 2 and the analysis and prediction AP 4. If the analysis and prediction AP 4 has predicted a failure in the first OS 611 or the service AP 613 of the active system, then service transfer to the first OS 621 and the service AP 623 of the stand-by system is conducted by the inter-OS message communication controller 9 in the logical partitioning controller 60, which is not shown in FIG. 14 and which is formed in the same way as that in FIG. 12, and subsequently the first OS 611 of the active system is stopped by using the OS execution controller 58, and the first OS 621 of the stand-by system is executed instead.

In the foregoing description, the sixth embodiment shown in FIG. 14 includes a logically partitioned virtual computer system. Alternatively, it is also possible to store two first OS's and one second OS in the memory and form the computer system in the same way as FIG. 2 even without using the logical division.

Figure 15:
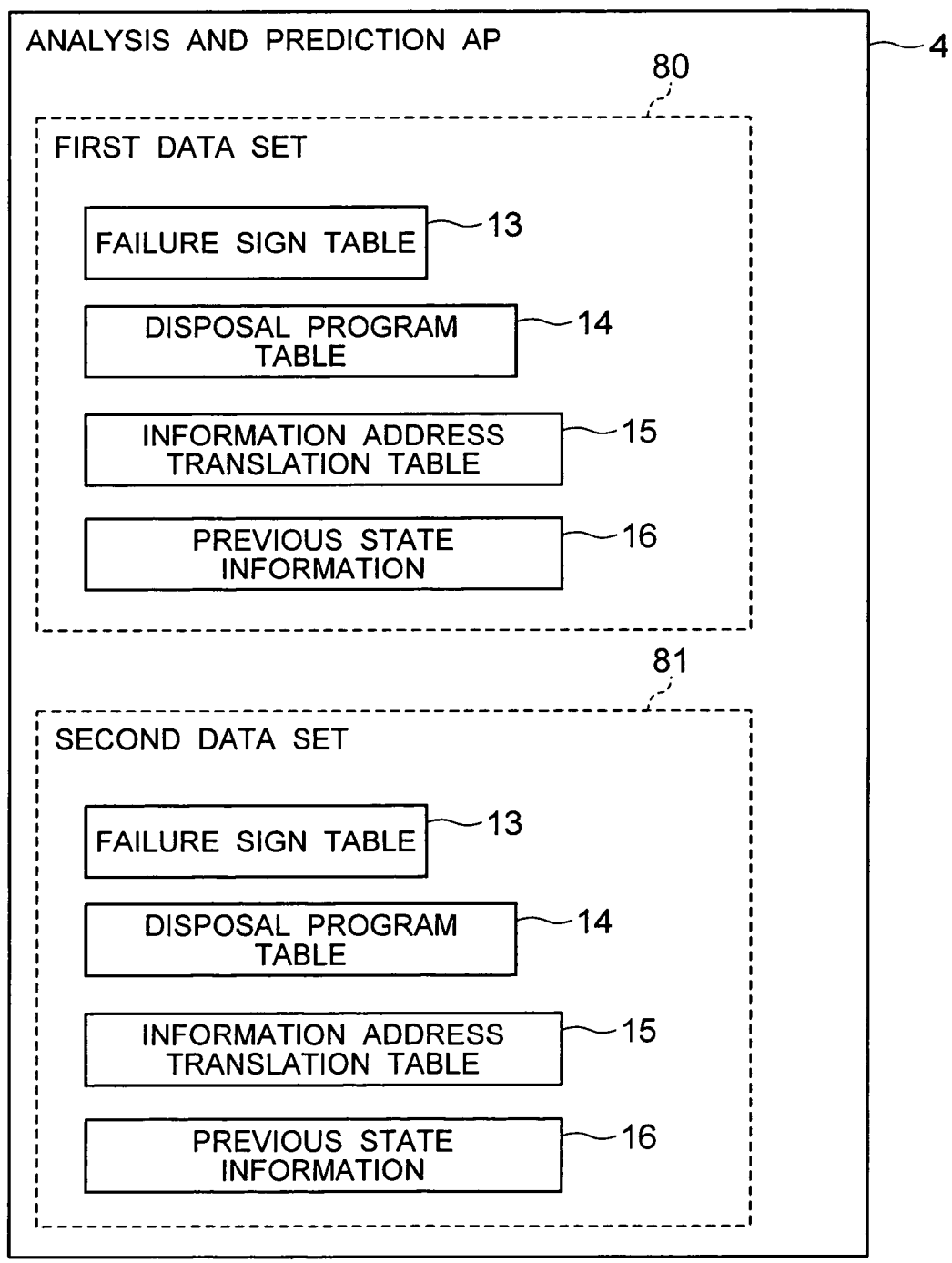
FIG. 15 is a diagram showing a data table example used by an analysis and prediction AP 4.

FIG. 15 is a diagram showing data tables used by the analysis and prediction AP 4 in the sixth embodiment.

If there is one or more first OS 1 to be analyzed with respect to one analysis and prediction AP 4 in the sixth embodiment shown in FIG. 14, a large number of analysis subjects is coped with by using separate ones every subject OS as the failure signal table 13, the failure disposal table 10, the disposal program table 14 and the information address table 15 to be used for the analysis. For example, in the case where the number of the first OS's that become subjects is two, the analysis and prediction AP 4 copes with two different first OS's by having a first data set 80 and a second data set 81 for the first OS's. Contents of the data sets 80 and 82 are similar to those described with reference to FIGS. 6 to 8.

According to the sixth embodiment having the above-described configuration, the number of the second OS's 2 can be held down, and consequently resources, such as memories and disks, used by the second OS and the analysis and prediction AP can be reduced.

As a variant of the sixth embodiment, there is a method of forming a system by using a plurality of first OS's 1 and a single OS 2 and operating a plurality of analysis and prediction APs 4 on the single OS 2. According to the variant, the number of the second OS's 2 can be held down in the case where the number of OS's to be analyzed is not so large.

In the computer systems according to the fourth to sixth embodiments described above, the hardware configuration may be substantially the same as that described in the first embodiment, and detailed operations other than the operation described in the embodiments are also substantially the same as those described in the first embodiment.

Figure 16:
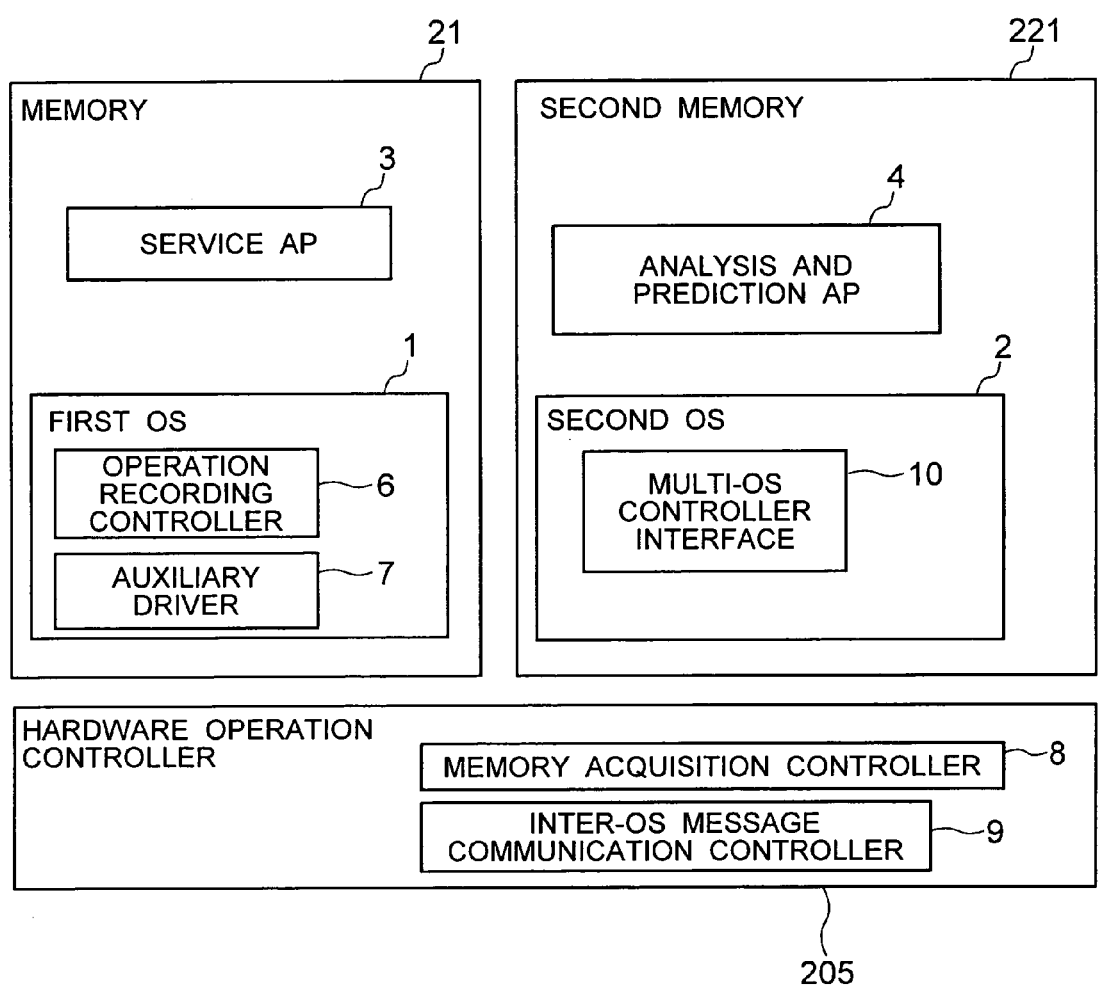
FIG. 16 is a diagram showing a configuration example of programs stored in a memory in a variant of a computer system according to a first embodiment.

FIG. 16 is a diagram showing a configuration example of programs stored in memories in a variant of the computer system according to the first embodiment.

In the foregoing description of the first embodiment, all programs, such as APs and OS's, are stored in one memory. In the present variant, it is also possible when forming a multi-OS configuration to provide a second memory 221 physically isolated from the memory 21 storing the first OS 1, store the second OS 2 and the analysis and prediction AP 4 in the second memory 221 as shown in FIG. 16, and conduct switching to the second OS by using a hardware operation controller 205.

According to the present invention, a plurality of OS's are operated simultaneously, and the states of the other OS and APs in operation are analyzed at any time from an AP in one OS. A sign leading to a failure is detected, and processing against a possible failure is conducted. Even if an OS or AP becomes unstable and inoperable, it becomes possible to detect a sign of a failure before the failure occurs, execute processing to dispose of the failure, and hold down the influence of the failure to the minimum.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system, comprising:
a first OS;
a service application operating on the first OS to conduct ordinary business processing;
a second OS differing from the first OS;
an analysis and prediction application operating on the second OS; and
a multi-OS controller controlling so that the first OS and the second OS execute programs independently from each other,
wherein the first OS holds state information and operation recording information of the first OS itself, and
wherein the analysis and prediction application analyzes contents of information held by the first OS and detects a sign of a failure,
wherein the multi-OS controller includes a memory acquisition controller acquiring location of memory which is used by the first OS and storing the state information and the operation recording information of the first OS,
wherein the first OS comprises an auxiliary program to assist the analysis and prediction application,
wherein the analysis and prediction application which operates on the second OS, holds lists of a memory location, which stores the state information and the operation recording information of the first OS, acquired by the memory acquisition controller, an analysis method, and processing to be conducted against a failure, and
the auxiliary program conducts the processing against a failure of the first OS by referring to contents of the processing list on the basis of the detected failure sign.

2. The computer system according to claim 1, wherein the analysis and prediction application notifies an external terminal of contents of an analyzed failure sign.

3. A computer system, comprising:
a first computer; and
a second computer;
the first computer comprising:
a first OS;
a service application operating on the first OS to conduct ordinary business processing;
a second OS differing from the first OS;
an analysis and prediction application operating on the second OS; and
a multi-OS controller controlling so that the first OS and the second OS execute programs independently from each other, p1 wherein the first OS holds state information and operation recording information of the first OS itself,
wherein the multi-OS controller includes a memory acquisition controller acquiring location of memory which is used by the first OS and storing the state information and the operation recording information of the first OS,
wherein the first OS comprises an auxiliary program to assist the analysis and prediction application,
wherein the analysis and prediction application which operates on the second OS, analyzes contents of information held by the first OS, holds lists of a memory location, which stores the state information and the operation recording information of the first OS, acquired by the memory acquisition controller, an analysis method, and processing to be conducted against a failure,
and if the analysis and prediction application has detected a sign of a failure that cannot be subject to self-restoration, the analysis and prediction application notifies the second computer of analyzed contents of the failure and makes the second computer take over processing, and
the auxiliary program conducts the processing against a failure of the first OS by referring to contents of the processing list on the basis of the detected failure sign.

4. A computer system, comprising:
a plurality of first OS's;
a plurality of service applications respectively operating on the first OS's to conduct ordinary business processing;

a second OS differing from the first OS's;
an analysis and prediction application operating on the second OS;
a multi-OS controller controlling so that the first OS and the second OS execute programs independently from each other,
wherein each of the first OS's holds state information and operation recording information of the first OS itself, and
wherein the analysis and prediction application analyzes contents of information held by each of the first OS's and detects a sign of a failure,
wherein the multi-OS controller includes a memory acquisition controller acquiring location of memory which is used by the first OS and storing the state information and the operation recording information of the first OS,
wherein the first OS comprises an auxiliary program to assist the analysis and prediction application,
wherein the analysis and prediction application which operates on the second OS, holds lists of a memory location, which stores the state information and the operation recording information of the first OS, acquired by the memory acquisition controller, an analysis method, and processing to be conducted against a failure, and
the auxiliary program conducts the processing against a failure of the first OS by referring to contents of the processing list on the basis of the detected failure sign.

5. A computer system, comprising a plurality of virtual multi-OS sets, each of the virtual multi-OS sets comprising:
a first OS;
a service application operating on the first OS to conduct ordinary business processing;
a second OS differing from the first OS; and
an analysis and prediction application operating on the second OS;
a multi-OS controller controlling so that the first OS and the second OS execute programs independently from each other,
wherein the first OS holds state information and operation recording information of the first OS itself,
wherein the analysis and prediction application analyzes contents of information held by the first OS and detects a sign of a failure, and
wherein the first OS and the second OS in each of the virtual multi-OS sets are switched alternately to execute operation, and the analysis and prediction application in each of the virtual multi-OS sets analyzes contents of information held by the first OS in the own set and detects a sign of a failure,
wherein the multi-OS controller includes a memory acquisition controller acquiring location of memory which is used by the first OS and storing the state information and the operation recording information of the first OS,
wherein the first OS comprises an auxiliary program to assist the analysis and prediction application,
wherein the analysis and prediction application which operates on the second OS, holds lists of a memory location, which stores the state information and the operation recording information of the first OS, acquired by the memory acquisition controller, an analysis method, and processing to be conducted against a failure, and
the auxiliary program conducts the processing against a failure of the first OS by referring to contents of the processing list on the basis of the detected failure sign.

6. The computer system according to claim 5, wherein if an analysis and prediction application in one of the virtual multi-OS sets has detected a sign of a failure in the first OS in the own set, the analysis and prediction application notifies other virtual multi-OS sets of analyzed contents of the failure and makes another virtual multi-OS set take over processing.

7. A failure sign detecting method in a computer system executing a plurality of OS's, comprising the steps of:
executing a first OS and a second OS in parallel and independent from each other;
analyzing contents of state information and operation recording information held by the first OS and detecting a sign of a failure, by using an analysis and prediction application operating on the second OS; and
acquiring location of memory which is used by the first OS and storing the state information and the operation recording information of the first OS,
processing against a failure of the first OS by referring to contents of a processing list on the basis of the detected failure sign, and
notifying another computer system of the detected sign of the failure.

8. The failure sign detecting method according to claim 7, wherein the analysis and prediction application holds a list of a memory location to be analyzed, an analysis method, and processing to be conducted against a failure, and conducts processing against a failure of the first OS by using an auxiliary program included in the first OS to assist the analysis and prediction application, referring to contents of the processing list, on the basis of a failure sign.

* * * * *